(12) United States Patent
Wakabayashi (10) Patent No.: US 12,353,821 B2
(45) Date of Patent: Jul. 8, 2025

(54) INFORMATION PROCESSING APPARATUS, METHOD OF CONTROLLING INFORMATION PROCESSING APPARATUS, AND STORAGE MEDIUM THAT INCLUDE CHANGING A SIZE OF A MEDIUM FROM A FIRST SIZE TO A SECOND SIZE

(71) Applicant: CANON KABUSHIKI KAISHA, Tokyo (JP)

(72) Inventor: Yuuki Wakabayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 18/300,474

(22) Filed: Apr. 14, 2023

(65) Prior Publication Data

US 2023/0351094 A1 Nov. 2, 2023

(30) Foreign Application Priority Data

Apr. 28, 2022 (JP) ................................ 2022-074438

(51) Int. Cl.
*G06F 40/109* (2020.01)
*G06F 3/04847* (2022.01)

(52) U.S. Cl.
CPC ........ *G06F 40/109* (2020.01); *G06F 3/04847* (2013.01)

(58) Field of Classification Search
None
See application file for complete search history.

(56) References Cited

U.S. PATENT DOCUMENTS

| 6,256,650 | B1 * | 7/2001 | Cedar ..................... G06F 40/10 |
| | | | 715/273 |
| 8,209,600 | B1 * | 6/2012 | Koh ....................... G06F 40/103 |
| | | | 715/244 |
| 9,459,777 | B2 * | 10/2016 | Ryu ...................... G06F 40/109 |
| 10,108,695 | B1 * | 10/2018 | Yeturu ................... G06F 16/955 |
| 10,942,632 | B1 * | 3/2021 | Sefton .................. G06F 3/04845 |
| 2004/0051893 | A1 * | 3/2004 | Yoshida ............. G06K 15/1827 |
| | | | 358/1.11 |
| 2004/0119714 | A1 * | 6/2004 | Everett ................. G06F 40/109 |
| | | | 345/471 |

(Continued)

FOREIGN PATENT DOCUMENTS

JP H0-5120280 A 5/1993

*Primary Examiner* — Mandrita Brahmachari
(74) *Attorney, Agent, or Firm* — Venable LLP (57) ABSTRACT

A method of controlling an information processing apparatus includes receiving a first change operation for changing, from a first document size to a second, a size corresponding to an area in which an object can be laid out and is displayed on an interface along with a font size change scale bar. With the first operation, changing a settable range of the document font size, based on the second document size corresponding to the first operation, determining an upper limit of the settable range based on a reference value corresponding to a length of a side of the second document, and updating the font size change scale according to the upper limit. With a second change operation for changing the font size of the object laid out in the predetermined area to values settable on the scale bar, the scale bar is updated, changing the font size of the object.

19 Claims, 8 Drawing Sheets

(56) References Cited

U.S. PATENT DOCUMENTS

| | | | |
|---|---|---|---|
| 2005/0198566 A1* | 9/2005 | Takamine | G06F 3/125 |
| | | | 715/251 |
| 2006/0212801 A1* | 9/2006 | Berker | G06F 40/103 |
| | | | 715/205 |
| 2007/0016874 A1* | 1/2007 | Chaudhri | G06F 3/04847 |
| | | | 715/764 |
| 2012/0096344 A1* | 4/2012 | Ho | G06F 16/9577 |
| | | | 715/249 |
| 2012/0110438 A1* | 5/2012 | Peraza | G06F 40/109 |
| | | | 345/660 |
| 2014/0268185 A1* | 9/2014 | Gopalakrishnan | H04N 1/3875 |
| | | | 358/1.2 |
| 2014/0281934 A1* | 9/2014 | Zhang | G06F 40/106 |
| | | | 715/243 |
| 2014/0379698 A1* | 12/2014 | Wolfe, Jr. | G06Q 10/10 |
| | | | 707/722 |
| 2015/0067494 A1* | 3/2015 | Hattori | G06F 3/1206 |
| | | | 715/274 |
| 2018/0011822 A1* | 1/2018 | Kwak | G06F 40/106 |
| 2018/0367688 A1* | 12/2018 | Yellapragada | G06V 30/1452 |
| 2018/0367689 A1* | 12/2018 | Yellapragada | H04N 1/00771 |
| 2021/0064691 A1* | 3/2021 | Kandari | G06F 40/126 |
| 2022/0215606 A1* | 7/2022 | Radford | G06F 40/103 |
| 2022/0277132 A1* | 9/2022 | Li | G06F 40/109 |
| 2023/0025450 A1* | 1/2023 | De La Comble | G06N 3/082 |

* cited by examiner

INFORMATION PROCESSING APPARATUS, METHOD OF CONTROLLING INFORMATION PROCESSING APPARATUS, AND STORAGE MEDIUM THAT INCLUDE CHANGING A SIZE OF A MEDIUM FROM A FIRST SIZE TO A SECOND SIZE

CROSS-REFERENCE TO PRIORITY APPLICATION

This application claims the benefit of Japanese Patent Application No. 2022-074438, filed Apr. 28, 2022, which is hereby incorporated by reference herein in its entirety.

BACKGROUND

Field

The present disclosure relates to an information processing apparatus, a method of controlling the information processing apparatus, and a program.

Description of the Related Art

Conventionally, there has been known a technique of creating a poster, and the like, by inserting desired character data or image data, and the like, into a template that is laid out in advance. For creating a poster, some types of application software for implementing printing layout processing have been released. The above-mentioned application software can allow a user to select a desired layout and edit the layout by changing the document size, adding an image and text, or the like, to complete a poster and to perform printing.

Creating a layout has demanded operability in an operation of changing the font size of text. In general, the operability includes that, for example, the font size of text can be changed by a scale bar, and the font size can be changed in stages by pressing a button.

Additionally, Japanese Patent Laid-Open No. H5-120280 (hereafter, referred to as the '280 document) describes a technique of calculating an appropriate font size based on the number of already-inputted characters, the total sum of the number of inputted characters, and the height of a row.

SUMMARY

There has been demanded in printing layout processing a technique of further improving the convenience of an operation of changing the font size.

A method of controlling an information processing apparatus according to an aspect of the present disclosure includes determining a document size, which is a size of a document, as a first determination step, and determining a set value that is used in a font size change function, which is a function of changing a font size of an object that is applied to the document, based on the determined document size, as a second determination step.

Further features of the present invention will become apparent from the following description of exemplary embodiments with reference to the attached drawings.

DESCRIPTION OF THE EMBODIMENTS

Embodiments are described below in detail with reference to the appended drawings. Note that, the following embodiments are not intended to limit the disclosure according to the scope of claims. Although multiple characteristics are described in the embodiments, not all the multiple characteristics are necessarily essential for the disclosure, and the multiple characteristics may be arbitrarily combined with each other. Additionally, in the appended drawings, the same reference numerals are provided to the same or similar configurations, and duplicated descriptions are omitted.

Embodiment 1

<System Configuration>

An information processing apparatus to which the present disclosure is applied is described. A personal computer (PC) may be an example of the information processing apparatus. Any apparatus, however, may be applied as long as it can execute operations of displaying and editing text and also allows for program operation. For example, the present disclosure is applicable to a mobile terminal, a laptop PC, a tablet terminal, a personal digital assistant (PDA), and the like.

Figure 1:
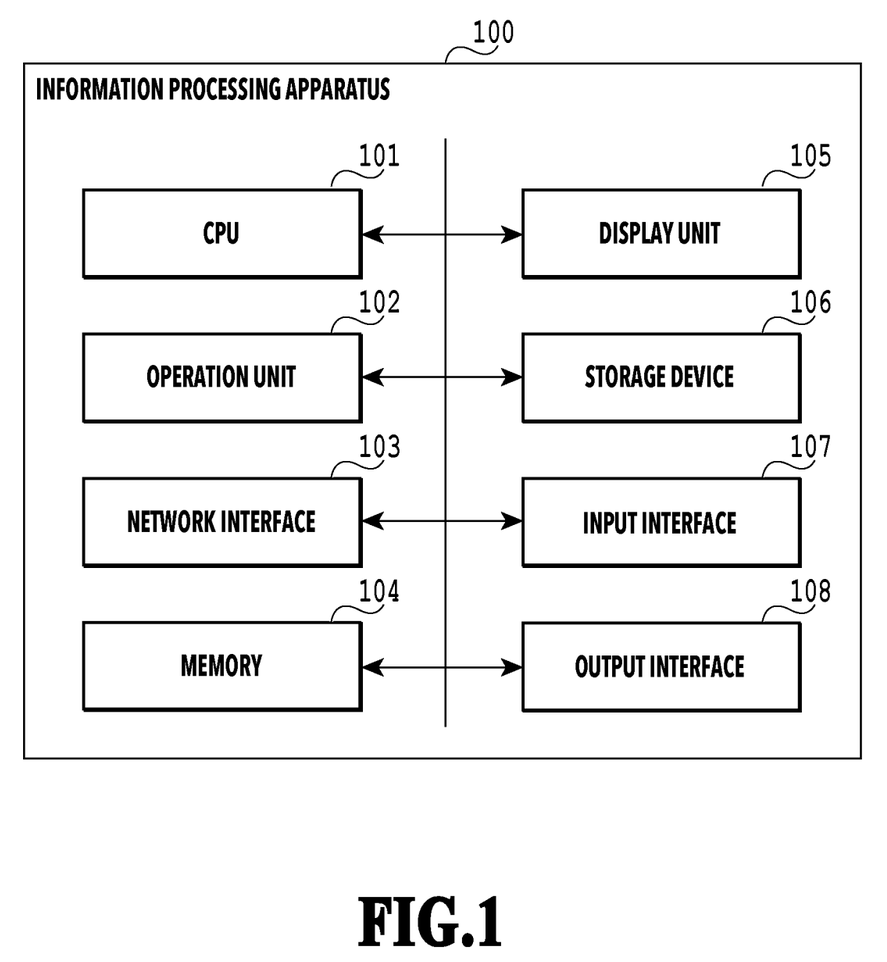
FIG. 1 is a diagram illustrating a configuration of an information processing apparatus.

FIG. 1 is a diagram illustrating a hardware configuration of an information processing apparatus 100 of the present embodiment. The information processing apparatus 100 includes a CPU 101, an operation unit 102, a network interface 103, a memory 104, a display unit 105, a storage device 106, an input interface 107, and an output interface 108. Additionally, the units are connected to each other through a system bus.

The CPU 101 controls overall the information processing apparatus 100. The operation unit 102 is an operation unit for a user to give an instruction to the information processing apparatus 100 and includes a button, a touch panel, and the like, for example. Note that, FIG. 1 illustrates an example of a case when the operation unit 102 is incorporated in the information processing apparatus 100 An external keyboard, or the like, however, may be connected to the input interface 107 to operate the information processing apparatus 100 therefrom.

The network interface 103 is an interface for connection with a network. The information processing apparatus 100 is formed to be connectable to a network through the network interface 103.

The memory 104 is a random access memory (RAM) as a work area of the CPU 101 and is used as a temporal storage area of various received data or stores various setting data. The display unit 105 is a unit that displays various types of information and includes a liquid crystal panel, and the like.

Note that, FIG. 1 illustrates an example of a case when the display unit 105 is incorporated in the information processing apparatus 100. An external display, however, may be connected to the output interface 108 to display contents thereon.

The storage device 106 is a flash memory, or the like, for example, and stores various control programs such as an application and an operating system (hereafter, referred to as OS) or various types of information used by the above programs. The input interface 107 for the later-described poster creation application is an interface that receives data input or an operation instruction from the user. The input interface 107 includes a physical keyboard, a button, a touch panel, and the like, for example. Note that, the later-described output interface 108 and the input interface 107 may be integrated with each other such that output to a screen and receiving an operation from the user are implemented by using common hardware.

The output interface 108 is an interface that performs control for displaying data on an external display, or the like, or presenting information on a state of the information processing apparatus 100. The output interface 108 outputs control information for displaying information on the external display and display target information, for example. The external display includes a light-emitting diode (LED), a liquid crystal display (LCD), and the like, and displays data or notifies the user of a state of the information processing apparatus 100. Note that, a software keyboard including keys such as a numerical value input key, a mode setting key, a determination key, a cancel key, and a power source key may be displayed on the external display to receive input from the user through the software keyboard.

<Poster Creation Application>

Figure 2:
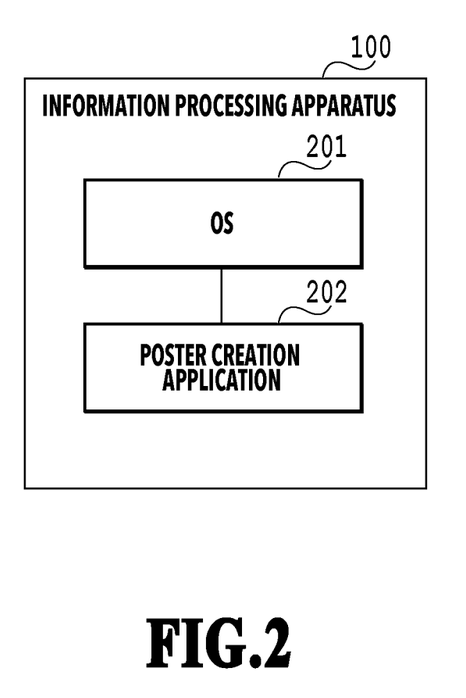
FIG. 2 is a diagram illustrating a configuration of a system.

FIG. 2 is a diagram illustrating a functional configuration example of the information processing apparatus 100. In the present embodiment, the information processing apparatus 100 includes an OS 201 and a poster creation application 202. The user creates poster data on a display screen of the poster creation application 202 that can be operated on the OS 201. The created poster data may be posted on a website or a social networking service (SNS) or may be printed by a printing apparatus connected to the information processing apparatus 100, for example. Additionally, although the poster creation application 202 is incorporated in the information processing apparatus 100 in the present embodiment, the poster creation application 202 may be in the form of a Web application, for example.

Next, an example of a flow of a creation operation by the poster creation application 202 is described.

Figure 3:
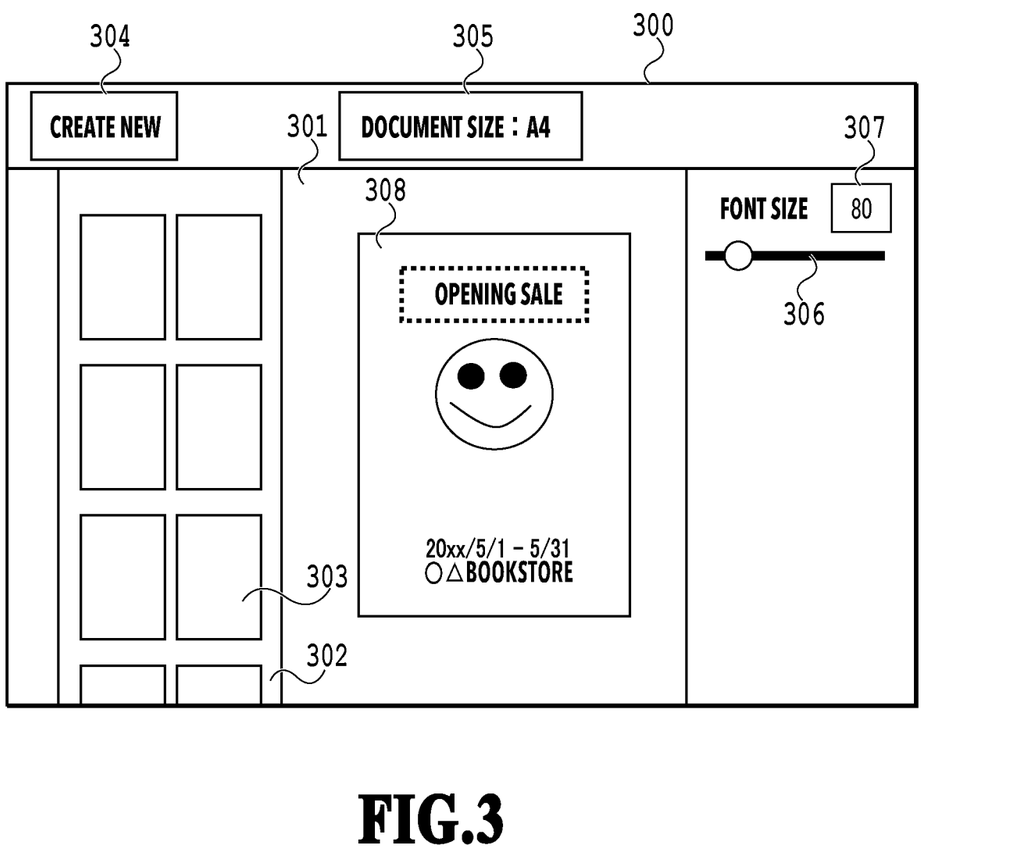
FIG. 3 is a diagram illustrating an edit screen of a poster creation application.

FIG. 3 is a diagram illustrating an example of a poster edit screen. The CPU 101 of the information processing apparatus 100 displays and controls the poster edit screen on the display unit 105 by executing a program corresponding to the poster creation application 202 that is stored in the memory 104 or the storage device 106, for example.

In the present embodiment, a poster edit screen 300 includes a poster preview area 301, a poster template selection area 302, a poster template 303, and a create-new button 304. Additionally, the poster edit screen 300 includes a document size change button 305, a font size change scale bar 306, and a font size display box 307.

A preview of poster data 308 is displayed in the poster preview area 301, and the user confirms or changes the layout of the poster. The poster templates 303 of different designs are displayed in the poster template selection area 302. The poster template 303 is selected, and, accordingly, the selected poster template is displayed in the poster preview area 301. The document size of a corresponding poster is set to the poster template 303, and the poster template 303 is displayed at a ratio of the corresponding document size while being displayed on the poster preview area 301.

The poster data 308 is created not only by being selected from the templates, and it is also possible to create a poster from a blank sheet by pressing the create-new button 304. The document size of the poster data 308 in a case of creating from a blank sheet may be, for example, a fixed value of a defined size such as A2 or may be set freely by the user at the time of creating a new poster. As long as a document size is set to the poster data 308, any setting method may be applied. Additionally, it is possible to change the document size of the poster data 308 by selecting the document size change button 305. It is also possible to change the document size to a defined size such as A4 or A0, and, moreover, it is possible for the user to set an arbitrary custom size.

The font size change scale bar 306 can change the font size of a text object laid out in the poster data 308. As a settable range of the font size, a lower limit value and an upper limit value are set to the font size change scale bar 306. Note that, hereafter, the lower limit value and the upper limit value of the scale bar are the lower limit value and the upper limit value of a range settable by the scale bar. The font size set to the text object is displayed in the font size display box 307. The font size is displayed in the font size display box 307 and may also be directly inputted or changed. Note that, a function of changing the font size in the poster creation application 202 such as the font size change scale bar 306 and the font size display box 307 is called a font size change function.

In a case of changing the font size of text by the font size change scale bar 306 in FIG. 3, usually, the lower limit value and the upper limit value of the scale bar are set. In a case when the application software can create great data with a length of 18 m such as a banner, the font size needs to be about 5000 pt, for example, and the upper limit value may be set to 5000 pt. (1 pt=$\frac{1}{72}$ inch.) If this setting is also applied to the font size change scale bar 306 as the upper limit value settable by the application regardless of the document size, there is a possibility that an extremely great upper limit value is set depending on the document size.

In a case of the document size of A4, it is sufficient in many cases to set the upper limit value of the font size to about 600 pt, and if the upper limit value is set to be greater than 600 pt such as 5000 pt, it may be undesirable for creating the A4 size layout. Additionally, with the setting of this upper limit value, an operation range that may be set for changing the font size of the A4 size document by using the font size change scale bar 306 is about ten percent of the whole scale bar. That is, the other ninety percent is an inappropriate size for the font size to be used in the A4 size document. In a case of trying to change the font size in the above situation, it is difficult to fine-adjust the size by the scale bar.

In the present embodiment, here is described a method that can provide a scale bar of an appropriate operation range by setting the upper limit value of the font size in accordance with the document size at the time of determining the document size so as to set the upper limit value of the scale bar before the user performs an edit operation.

Figure 4:
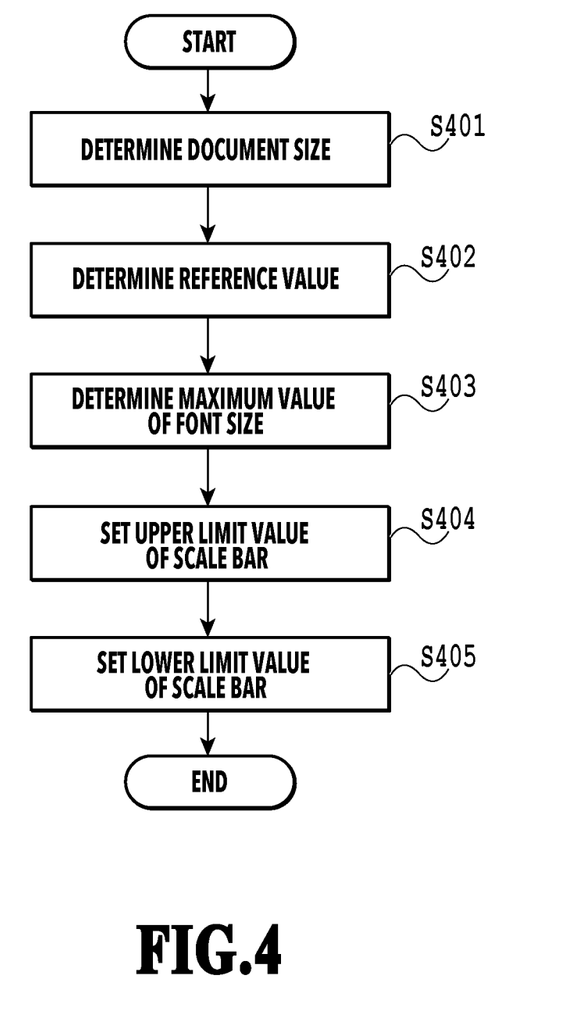
FIG. 4 is a flowchart of setting of an upper limit value and a lower limit value of a font size change scale bar.

FIG. 4 is a flowchart of setting of a range of an appropriate font size regardless of the document size. A series of processing indicated in the flowchart is performed with a program code stored in the storage device 106 being deployed to and executed in the memory 104 by the CPU 101 of the information processing apparatus 100. Note that, "S" in the following descriptions of the processing means a step in the flowchart, and the same applies to the following embodiment.

First, in S401, in the above-described poster edit screen 300, the CPU 101 of the information processing apparatus 100 selects the poster template 303 or determines the poster data 308 as a new creation and then determines the document size of the poster data 308. Additionally, the step also includes processing for a case of changing the document size determined once to a new document size by the document size change button 305.

Once the document size is determined in S401, in S402, the CPU 101 determines a reference value for determining the maximum value of the font size. In the present embodiment, as an example of a method of determining the reference value, a value of a short side of the document size is used as the reference value. The reason why using the value of the short side as the reference value for determining the maximum value of the font size is because the text is usually fitted in the area of the document as long as it is in the font size within the dimension of the short side of the document size.

Once the short side of the document size of the poster data is determined as the reference value in S402, in S403, the CPU 101 determines the maximum font size that allows one character to be fitted in the dimension of the document size. That is, in the present embodiment, based on the reference value, a set value that is set as the upper limit value of the scale bar is determined. The set value based on the reference value is a value that defines a changing range used in the font size change function and may be a value other than the upper limit value of the scale bar. For example, in the later-described Embodiment 2, the set value based on the reference value is set as a change ratio for increasing or decreasing the font size in the font size change function. Additionally, the set value may be set as another value. Moreover, both the upper limit value of the scale bar and the above-described ratio may be set based on the reference value. For example, the change ratio for increasing or decreasing the font size per predetermined movement amount (unit movement amount) of a tab on the scale bar may be set to be greater as the upper limit value of the scale bar is greater.

One of the units used for the font size, pt, is 1 pt=$\frac{1}{72}$ inch. Accordingly, the size of the short side (inch), that is, a value obtained by multiplying the reference value by 72 is determined as the maximum value of the font size fitted in the short side. For example, the maximum value of the font size fitted in a document with the short side of 1 inch is 72 pt, and the maximum value of the font size fitted in a document with the short side of 3 inches is 216 pt.

In S404, the CPU 101 sets the determined maximum value of the font size as the upper limit value of the scale bar. In this process, the set upper limit value of the scale bar may be used as the upper limit value of the font size settable for the poster data 308. Note that, the upper limit value of the font size settable for the poster data 308 may be the same as the upper limit value of the font size settable by the poster creation application 202 regardless of the document size. In this case, the maximum value of the font size settable by the scale bar is the value determined in S403. However, it may also be applicable to directly input a value exceeding the font size settable by the scale bar to the font size display box 307.

In S405, the CPU 101 sets the lower limit value of the scale bar. The lower limit value of the scale bar may be the same as the lower limit value of the font size settable by the poster creation application 202 regardless of the document size. In this case, it is possible to use a small font size no matter how great a poster is, and it is also possible to write detailed information. Additionally, if the lower limit value of the font size is set to a predetermined value regardless of the document size, the present step does no need to be executed and may be omitted.

Moreover, the lower limit value of the scale bar may be changed in accordance with the document size. In this case, for example, if the document size A4 is a reference document size and the lower limit of the font size for the document size A4 is 6 pt, the lower limit of the font size for the document size A2 is 12 pt. This is because, since the short side size of A2 is twice the short side size of A4, the minimum font size settable by the scale bar is 12 pt, which is twice 6 pt in A4. This makes it possible to provide the same operational feeling to the user regardless of the document size in a case of changing the document size between the document sizes of the same aspect ratio (a ratio between the long side and the short side in a rectangle). Note that, in the present embodiment, regardless of that the upper limit value and the lower limit value of the scale bar are set to which value, the dimension itself of the displayed scale bar is not varied, as illustrated in FIGS. 5A to 5F. In other words, the display size of the scale bar is not in accordance with the magnitude of the upper limit value and the lower limit value of the scale bar. In this case, it is preferable that the change ratio for increasing or decreasing the font size per predetermined movement amount (unit movement amount) of the tab on the scale bar is greater as the upper limit value of the scale bar is greater and the range settable by the scale bar is greater. Note that, a mode in which the dimension itself of the displayed scale bar is also changed in accordance with the range settable by the scale bar may be applicable. In a case of this mode, control of the above-described ratio in accordance with the range settable by the scale bar as described above may not be executed.

Figure 5A:
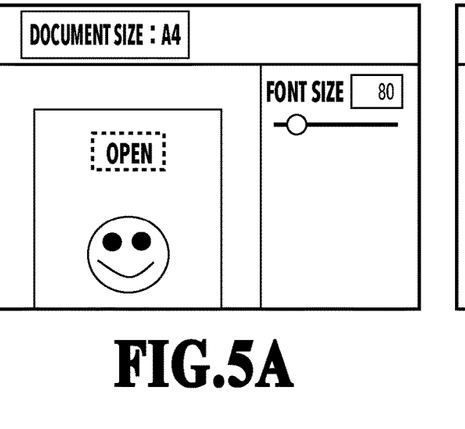
FIGS. 5A to 5F are diagrams illustrating a state of the font size change scale bar in accordance with a document size and a font size.
Figure 5B:
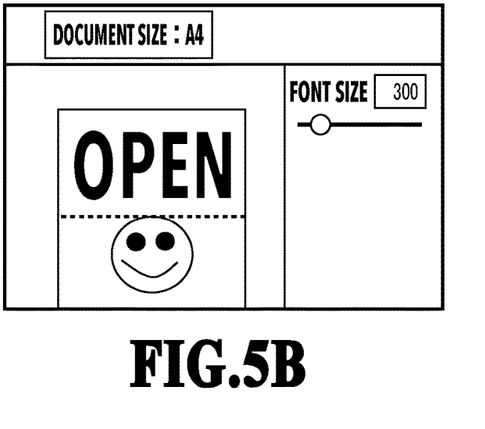
Figure 5C:
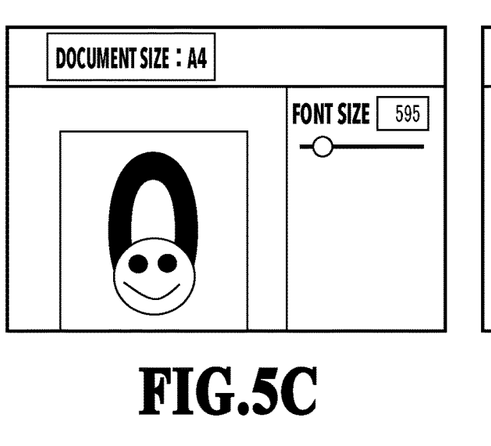
Figure 5D:
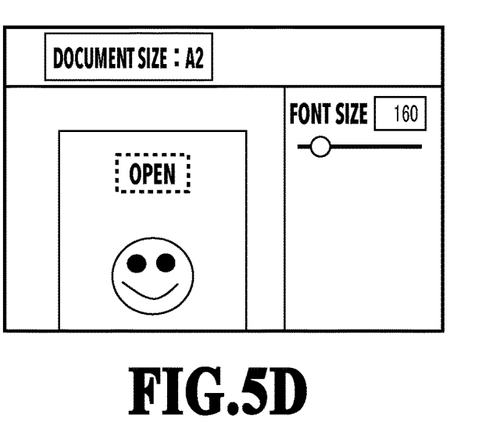
Figure 5E:
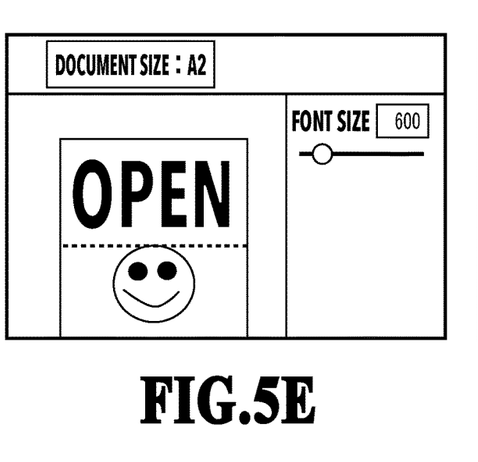
Figure 5F:
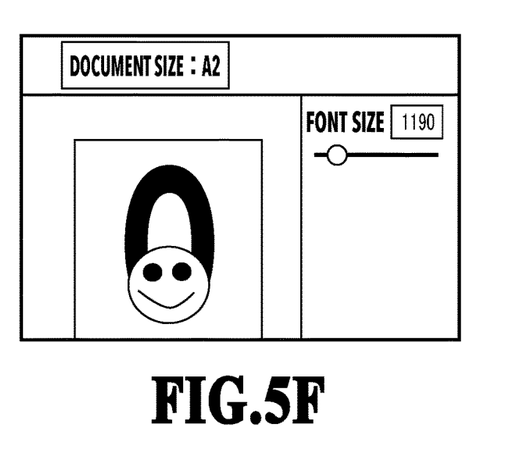

FIGS. 5A to 5F are diagrams illustrating a relationship between the font size and the font size change scale bar 306 in a case of applying the processing performed in FIG. 4. FIGS. 5A to 5C illustrate poster data for the document size of A4 while FIGS. 5D to 5F illustrate poster data for the document size of A2.

FIG. 5A is a diagram in which characters of "OPEN" are laid out with a font size of 80 in the poster data in a case of the document size of A4. As illustrated in FIG. 5A, it can be seen that the tab of the scale bar is positioned close to the left end of the font size change scale bar 306. FIG. 5B is a diagram of a case when the font size change scale bar 306 is moved to the right to set the font size to 300 from the state of FIG. 5A such that the four characters of "OPEN" are fitted in the document size with the maximum size. Since it is a size that allows the four characters of "OPEN" to be fitted in the document size, the tab of the scale bar is positioned at substantially the center of the font size change scale bar 306.

Additionally, FIG. 5C is a case when the font size change scale bar 306 is moved to the right to be set to the maximum font size that allows only one character, "O", to be fitted in the document. The maximum font size in this case is determined in S402 based on the short side size of A4, and the tab of the scale bar is positioned at the right end of the font size change scale bar 306. With application of the present embodiment as described above, it is possible to utilize the font size change scale bar 306 as much as possible from a small font size to a font size for a case of filling the document size with one character. Note that, the lower limit value of the font size change scale bar 306 may be a value in accordance with the setting in S404. The lower limit value may be a fixed value in any document size regardless of the document size or may be set in accordance with the document size as illustrated in FIGS. 5A to 5F.

FIG. 5D is a diagram of a case when the document size is changed to A2 while using the layout in FIG. 5A. In a case of changing the document size between sizes of the same aspect ratio, if the layout is the same, the font size of each text is changed but the position of the tab of the scale bar is not changed. That is, the ratio of the increase-decrease amount of the font size by the operating the scale bar is not changed. This is similar between FIGS. 5B and 5E in which the font size change scale bar 306 is positioned at a similar place. Additionally, the same applies to FIGS. 5C and 5F. Thus, it is possible to utilize the font size change scale bar 306 as much as possible even if the document size is changed to A2.

As above, according to the present embodiment, it is possible to improve the convenience of the font size change operation. Specifically, it is possible to utilize as much as possible the font size change scale bar regardless of the document size by setting an appropriate upper limit value of the font size in accordance with the document size, and it is possible to improve the user operability.

Note that, in the present embodiment, the maximum value of the font size is determined by calculation in S403 based on the reference value, which is the short side size of the document size in S402. For example, however, instead of calculation, a correspondence table of the font size in accordance with the short side size prepared in advance may be used. In the correspondence table of the font size, the short side size and the font size are written in association with each other, and the format is not limited as long as it clearly shows a corresponding font size of an arbitrary short side size.

Additionally, in the present embodiment, the size of the short side of the document size is used as the reference value u The type of the reference value, however, is not limited as long as it is a value that varies in accordance with the document size such as, for example, the size of a long side or the length of a diagonal line and it is an appropriate reference value for determining the maximum value of the font size.

Moreover, in the present embodiment, the upper limit value of the font size in the document size is determined, and the determined value is set to the upper limit value of the scale bar. The upper limit value of the font size settable in the poster creation application and the upper limit value of the scale bar do not, however, necessarily coincide with each other. In a case when the values do not coincide with each other, the font size settable in the poster creation application is greater than the upper limit value of the scale bar in the document size. That is, a value exceeding the font size settable by the scale bar may be set, and, in this case, the font size is set by directly inputting a value to the font size display box 307.

Furthermore, as described above, in a case when the long side of the document size is set to the reference value instead of the short side of the document size, for example, the font size is not fitted in the document size if the scale bar is at the upper limit value. However, such a mode may be applicable.

Additionally, in the above-described embodiment, as an example, a method of setting the font size by using the font size display box is described. However, it is not limited thereto. As long as it is a unit that can set the font size other than the font size change scale bar 306, it may not be directly input and may be, for example, a button that can increase or decrease the font size by one, and any unit is applicable.

Moreover, in a case when the poster creation application can import a file of poster data, at the time of obtaining the poster data, the document size set to the poster data is determined and the maximum value of the font size is set based on the document size. In this case, if the font size of the text laid out on the read poster data is greater than the set upper limit value of the font size, the font size of the text may be reduced to be equal to or smaller the upper limit value of the font size.

Embodiment 2

In the above-described embodiment, a method of favorably setting the upper limit value and the lower limit value of the font size change scale bar 306 is described. In the present embodiment, a method of improving the operability of a button that increases or decreases the font size regardless of the document size is described.

Figure 6:
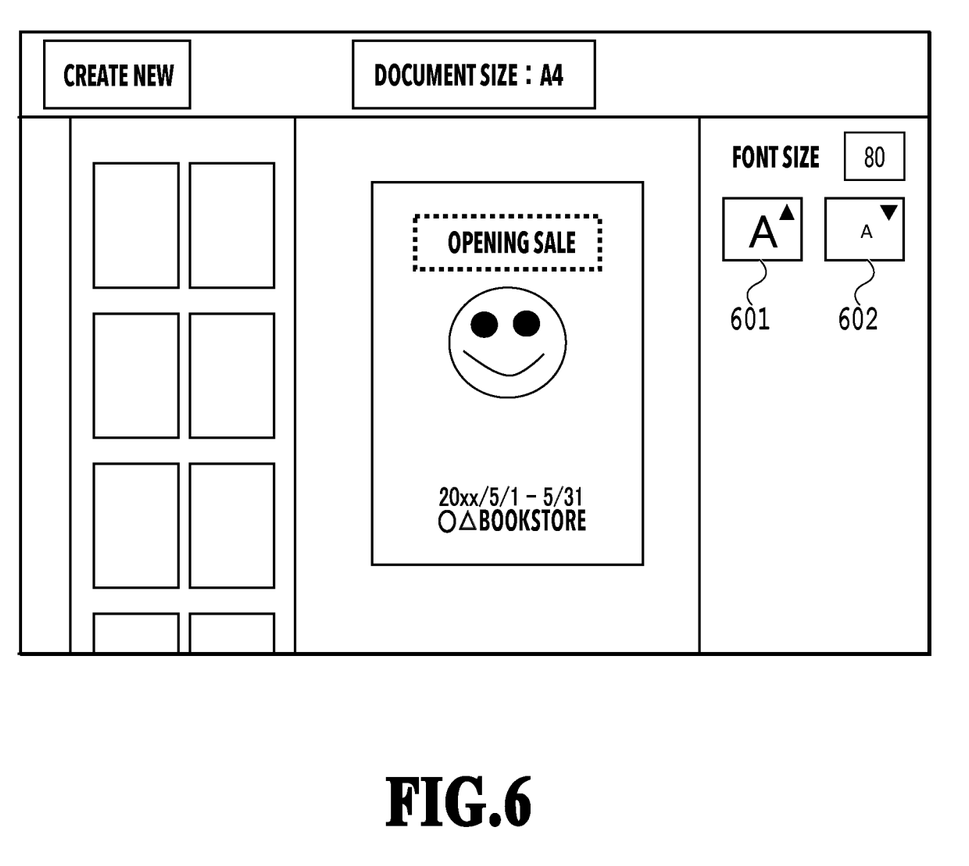
FIG. 6 is a diagram illustrating an edit screen of the poster creation application.

FIG. 6 is an explanatory view of the poster creation application 202 including a font size increase-decrease button. The font size increase-decrease button includes a font size increase button 601 and a font size decrease button 602. The font size being set is increased by one by pressing the font size increase button 601. The font size being set is decreased by one by pressing the font size decrease button 602. An increase-decrease amount while operating the font size increase-decrease button is smaller as the font size with respect to the document size is smaller and is greater as the font size with respect to the document size is greater. For example, assuming that there is a document in which the minimum font size is 6 pt and the font sizes of each stage of operating the font size increase button 601 are 6, 7, 8, 9, 10, 12, 14, 16, 18, 22, 26, and so on. The increase-decrease amount of the font size in this document is increased to be 1, 1, 1, 1, 2, 2, 2, 2, 4, 4, and so on, as the font size is increased.

The increase-decrease amount of the font size at the time of once pressing the font size increase-decrease button described above is desirably changed in accordance with the document size. For example, here is considered a case of changing the font size of a large document such as a banner by the font size increase button 601. In this case, if the font size is increased to be 6, 7, 8, 9, 10, 12, 14, 16, 18, 22, 26, and so on, by pressing the button as the above-described document, there is a risk that it takes time to change the font size to a desired font size.

Additionally, aside from the increase-decrease amount of the font size, the change ratio of the increase-decrease amount is desirably set to be constant in any sizes regardless of the document size. That is, the font size is increased at a constant ratio like, for example, twofold, fourfold, sixfold, and eightfold, from the minim font size of the document in any document sizes at the time of pressing the font size increase button 601. Thus, the dimension of the font size at the time of pressing the font size increase-decrease button is viewed in the same way in any document sizes, and this provides the user visibility and can lead to improvement of the operability. The above descriptions are further described below with reference to the drawings.

Figure 7:
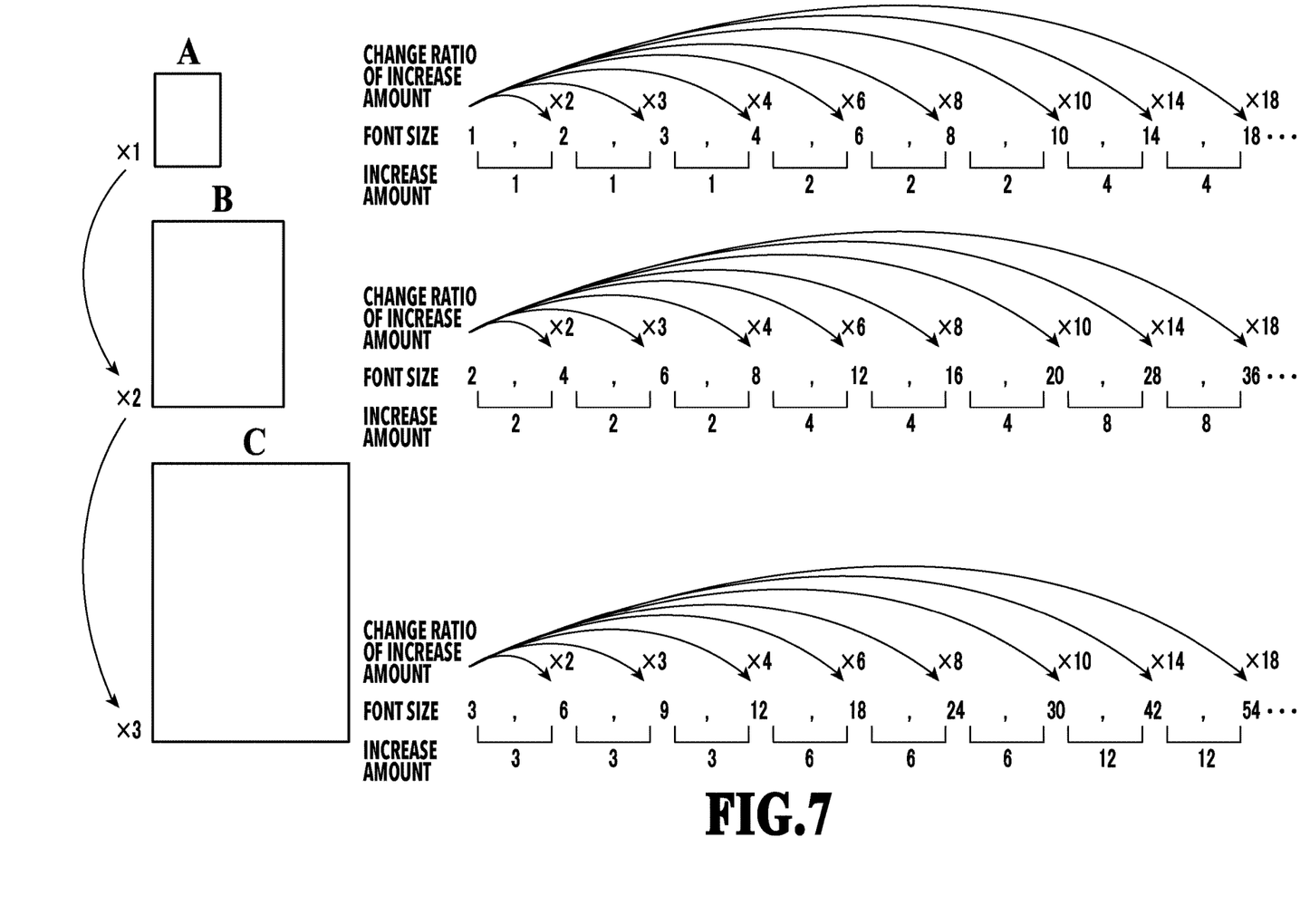
FIG. 7 is a diagram describing an increase-decrease amount of the font size in a case of operating a font size increase-decrease button.

FIG. 7 is a diagram illustrating three different document sizes (a document A, a document B, and a document C) in the present embodiment and values of the corresponding font sizes at the time of operating the font size increase button 601. The document B is twice the size of the document A, and the document C is three times the size of the document A. In this case, as illustrated in FIG. 7, the increase amount of the font size is set so as to be increased from the minimum value of 1 to 1, 1, 1, 2, 2, 2, 4, 4, and so on, in the document A. Additionally, the increase amount in the document B is set so as to be increased from the minimum value of 2 to 2, 2, 2, 4, 4, 4, 8, 8, and so on, and the increase amount in the document C is set so as to be increased from the minimum value of 3 to 3, 3, 3, 6, 6, 6, 12, 12, and so on, respectively. With the above setting, the increase amount of the button operation is in accordance with the corresponding document size. On the other hand, the change ratio of the increase amount is a common ratio, which is twofold, threefold, fourfold, sixfold, eightfold, tenfold, fourteenfold, eighteen fold, and so on, from the minimum value in the corresponding document. With the change ratio of the increase amount (increase-decrease amount) being set to be common regardless of the document size, changes in how the font size on the layout is viewed by the user are equalized, and thus it is possible to expect the improvement of the operability. A method of implementing the above-described setting is described below using a flowchart.

Figure 8:
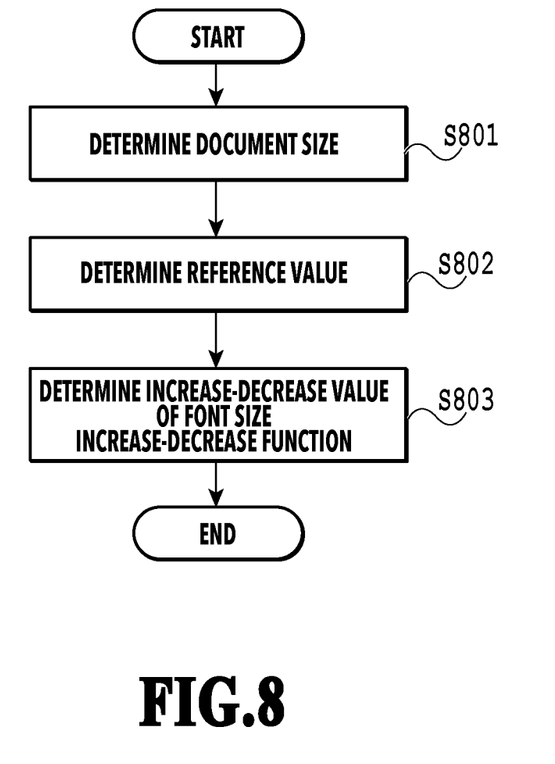
FIG. 8 is a flowchart of determination of the increase-decrease amount of the font size increase-decrease button.

FIG. 8 is a flowchart of determining the increase-decrease amount of the font size at the time of pressing the font size increase-decrease button in the present embodiment. S801 to S802 are the same processing as S401 to S402 of FIG. 4, and thus the descriptions are omitted.

In S803, the CPU 101 determines the increase-decrease amount of the font size at the time of operating a font size increase-decrease function in accordance with the short side size. The font size increase-decrease function is a function of changing the font size by pressing the font size increase-decrease button and is included in the font size change function. For example, in one document size, the reference value is set in advance such that values at stages of the font sizes settable by the font size increase-decrease function are 1, 2, 3, 5, 7, 10, 13, 17, 22, in which the minimum value is 1 and the maximum value is 22. The maximum value of the font size may coincide with the upper limit value of the font size settable in accordance with the document size, or the operable range may be smaller than the upper limit value.

The font size increase-decrease amount is determined by calculating a ratio with the short side size as the reference value of the font size increase-decrease amount based on the short side size determined in S802. For example, if the determined short side size is twice the short side size as the reference value of the font size increase-decrease amount, the values of the increase-decrease amount are also doubled, which are 2, 4, 6, 10, 14, 20, 26, 34, 44, in which the minimum value is doubled to two and the maximum value is doubled to forty-four, respectively. The aspect ratio between the increase-decrease amounts is not changed from the value of a case when the minimum value is one and the maximum value is twenty-two. That is, changes in how the document is viewed from the user at the time of operating the font size increase-decrease button are the same regardless of the document size.

As above, according to the present embodiment, regardless of the document size, as long as layouts at the same aspect ratio are applied, changes in how the font size on the layout are viewed at the time of operating the font size increase-decrease button are similar, and it is possible to improve the operability.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of controlling an information processing apparatus, the method comprising:
   receiving a first change operation for changing, from a size of a first document to a size of a second document, a size of a document corresponding to a predetermined area in which an object can be laid out on the document and that is displayed on an interface by the information processing apparatus along with a font size change scale bar;
   in a case when the first change operation is received, changing a settable range of the font size that may be used for the document, based on the size of the second document corresponding to the first change operation;
   determining an upper limit of the settable range based on a reference value that corresponds to a length of a side of the second document;
   updating the font size change scale bar displayed on the interface according to the determined upper limit; and
   in a case when a second change operation, which is an operation for changing the font size of the object laid out in the predetermined area on the document to any of the plurality of values that are settable on the scale bar, is received using the scale bar, after the font size change scale bar is updated, changing the font size of the object to a font size having a value, out of the plurality of values, corresponding to the received second change operation.

2. The method of controlling the information processing apparatus according to claim 1, wherein, in a case when the second document size is greater than the first document size, the maximum value, after the first change operation is received, is a value greater than the maximum value before the first change operation is received.

3. The method of controlling the information processing apparatus according to claim 1, further comprising, in a case when the first change operation is received, changing a minimum value out of the plurality of values based on the second document size corresponding to the first change operation, wherein the minimum value is a lower limit value of a range that is settable on the scale bar.

4. The method of controlling the information processing apparatus according to claim 1, wherein the object is a text object.

5. The method of controlling the information processing apparatus according to claim 1, wherein the first change operation is an operation in which a user sets an arbitrary custom size.

6. The method of controlling the information processing apparatus according to claim 1, wherein the first document size and the document second size are any of defined sizes including at least one of A4, A2, and A0.

7. The method of controlling the information processing apparatus according to claim 1, wherein, in a case when the first change operation is received, the maximum value is changed without changing the font size of the object that is laid out in the predetermined area.

8. The method of controlling the information processing apparatus according to claim 1, wherein, in a case when the first change operation is received, the maximum value is changed without changing a minimum value out of the plurality of values corresponding to the second change operation.

9. The method of controlling the information processing apparatus according to claim 1, further comprising performing processing for performing printing based on data corresponding to the predetermined area.

10. The method of controlling the information processing apparatus according to claim 1, wherein a display size of the scale bar is not in accordance with a magnitude of the maximum value.

11. The method of controlling the information processing apparatus according to claim 1, wherein, in a case when the maximum value is changed, a change ratio of the font size of the object per unit movement amount of a tab on the scale bar is further changed.

12. The method of controlling the information processing apparatus according to claim 1, further comprising determining the reference value related to the document size based on the second document size corresponding to the first change operation, and determining the maximum value based on the reference value.

13. The method of controlling the information processing apparatus according to claim 12, wherein the reference value is a value of a short side of the document having the second document size corresponding to the first change operation.

14. The method of controlling the information processing apparatus according to claim 12, further comprising changing a minimum value out of the plurality of values that are settable on the scale bar, the minimum value being a value that is reduced from the reference value at a constant ratio.

15. The method of controlling the information processing apparatus according to claim 1, wherein the scale bar is displayed both before and after the first change operation is received, and, in a case when the second change operation is received before the first change operation is received and before the maximum value is changed, the font size of the object is changed to the font size having the value corresponding to the received second change operation out of the plurality of values before being changed, and, in a case when the second change operation is received after the first change operation is received and after the maximum value is changed, the font size of the object is changed to the font size having the value corresponding to the received second change operation out of the plurality of changed values.

16. The method of controlling the information processing apparatus according to claim 1, wherein the scale bar is displayed both before and after the first change operation is received, and, even if the first change operation is received and the maximum value is changed, the display size of the scale bar is not changed.

17. The method of controlling the information processing apparatus according to claim 1, wherein the reference value is based on one of a value of a short side of the document size, a value of a long side of the document size, or a length of a diagonal line of the document.

18. A non-transitory computer readable storage medium storing a program that can be operated in an information processing apparatus and causes the information processing apparatus to function as:
a receiving unit configured to receive a first change operation for changing, from a size of a first document to a size of a second document, a size of a document corresponding to a predetermined area in which an object can be laid out on the document and that is displayed on an interface by the information processing apparatus along with a font size change scale bar;
a first change unit configured, in a case when the first change operation is received, to change a settable range of the font size that may be used for the document, based on the size of the second document corresponding to the first change operation;
a determining unit to determine an upper limit of the settable range based on a reference value that corresponds to a length of a side of the second document;
an updating unit to update the font size change scale bar displayed on the interface according to the determined upper limit; and
a second change unit configured, in a case when a second change operation, which is an operation for changing the font size of the object laid out in the predetermined area on the document to any of the plurality of values that are settable on the scale bar, is received using the scale bar, after the font size change scale bar is updated, to change the font size of the object to a font size having a value, out of the plurality of values, corresponding to the received second change operation.

19. An information processing apparatus comprising:
(A) at least one processor; and
(B) at least one memory storing instructions that, when executed by the processor, causes the information processing apparatus to function as:
(a) a receiving unit configured to receive a first change operation for changing, from a size of a first document to a size of a second document, a size of a document corresponding to a predetermined area in which an object can be laid out on the document and that is displayed on an interface by the information processing apparatus along with a font size change scale bar;

(b) a first change unit configured, in a case when the first change operation is received, to change a settable range of the font size that may be used for the document, based on the size of the second document corresponding to the first change operation;

(c) a determining unit to determine an upper limit of the settable range based on a reference value that corresponds to a length of a side of the second document;

(d) an updating unit to update the font size change scale bar displayed on the interface according to the determined upper limit; and (e) a second change unit configured, in a case when a second change operation, which is an operation for changing the font size of the object laid out in the predetermined area on the document to any of the plurality of values that are settable on the scale bar, is received using the scale bar, after the font size change scale bar is updated, to change the font size of the object to a font size having a value, out of the plurality of values, corresponding to the received second change operation.

\* \* \* \* \*